(12) United States Patent
Olson

(10) Patent No.: US 12,287,154 B1
(45) Date of Patent: *Apr. 29, 2025

(54) ENERGY TRANSFER SYSTEM WITH UNDERGROUND THERMAL STORAGE AND CORRESPONDING METHOD

(71) Applicant: Gaylord Olson, Morris Plains, NJ (US)

(72) Inventor: Gaylord Olson, Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,659

(22) Filed: Jun. 16, 2024

Related U.S. Application Data

(63) Continuation-in-part of application No. 18/584,190, filed on Feb. 22, 2024, now abandoned.

(60) Provisional application No. 63/594,000, filed on Oct. 29, 2023.

(51) Int. Cl.
| | | |
|---|---|---|
| *F28D 20/00* | (2006.01) | |
| *E02D 29/045* | (2006.01) | |
| *F24S 60/00* | (2018.01) | |
| *F24T 10/10* | (2018.01) | |

(Continued)

(52) U.S. Cl.
CPC ....... *F28D 20/0052* (2013.01); *E02D 29/045* (2013.01); *F24S 60/00* (2018.05); *F24T 10/10* (2018.05); *F24T 50/00* (2018.05); *F25B 27/002* (2013.01); *E02D 2300/0079* (2013.01); *F28D 20/0056* (2013.01); *F28D 2020/0078* (2013.01)

(58) Field of Classification Search
CPC ........... E02D 29/045; E02D 2300/0079; F24S 60/00; F24T 10/10; F24T 50/00; F25B 27/002; F28D 20/0052; F28D 20/0056; F28D 2020/0078
See application file for complete search history.

(56) References Cited

U.S. PATENT DOCUMENTS

| 462,179 | A | * | 10/1891 | Turley et al. | ....... F28D 20/0052 34/95 |
|---|---|---|---|---|---|
| 2,563,262 | A | * | 8/1951 | Moore | ...................... E03F 1/00 165/45 |

(Continued)

FOREIGN PATENT DOCUMENTS

| DE | 102018129822 | A1 | * | 5/2020 | .............. F24T 10/10 |
|---|---|---|---|---|---|
| EP | 3093582 | A1 | * | 11/2016 | .............. F24T 10/10 |

(Continued)

*Primary Examiner* — Ljiljana V. Ciric

(74) *Attorney, Agent, or Firm* — RosserIP, LLC; Roy Rosser

(57) ABSTRACT

A system and method of thermal energy storage and transfer that incorporate an underground thermal energy storage unit with horizontally arrayed heat exchangers surrounded by aggregate. The aggregate, composed of porous or semi-porous materials such as sand, soil, or crushed rock, may be moistened (10%-35% water by weight) to enhance thermal energy storage and insulated with a layer of dry aggregate shielded by waterproof materials. The system integrates components such as a heat pump, a thermal energy processing unit (e.g., a dry cooler or solar thermal array), and fluid interconnections including pumps and valves, thus allowing energy transfer between components. Horizontally arrayed heat exchangers, which may feature a spiral pipe or a slinky design to enable thermal energy distribution by directing heated fluid to central connections, optimizing heat retention.

12 Claims, 5 Drawing Sheets

(51) Int. Cl.
*F24T 50/00* (2018.01)
*F25B 27/00* (2006.01)

(56) References Cited

U.S. PATENT DOCUMENTS

| | | | | |
|---|---|---|---|---|
| 3,581,513 A * | 6/1971 | Cranmer, Jr. | ............ | F17C 3/005 62/260 |
| 3,791,443 A * | 2/1974 | Burt | ........................ | E02D 27/35 165/45 |
| 4,011,736 A * | 3/1977 | Harrison | ................ | F28D 20/026 165/104.31 |
| 4,059,959 A * | 11/1977 | Matthews | .................. | F03G 7/04 261/DIG. 11 |
| 4,139,321 A * | 2/1979 | Werner | ................ | F28D 20/0056 126/400 |
| 4,452,227 A * | 6/1984 | Lowrey, III | .............. | F24S 10/13 126/567 |
| 4,466,256 A * | 8/1984 | MacCracken | ....... | F28D 20/0052 126/400 |
| 4,674,561 A * | 6/1987 | Kelley | .................. | F24F 5/0046 165/45 |
| 8,443,794 B2 * | 5/2013 | Hulen | ....................... | F24D 3/12 126/643 |
| 8,851,066 B1 * | 10/2014 | Kapteyn | .................. | F24S 60/00 126/643 |
| 9,709,305 B2 * | 7/2017 | Sedlak | ....................... | F24D 3/18 |
| 11,105,568 B2 | 8/2021 | Olson | | |
| 2010/0115978 A1 * | 5/2010 | Simka | ....................... | F24D 3/18 62/238.7 |
| 2013/0333860 A1 * | 12/2013 | Stubler | ............... | F28D 20/0056 165/56 |

FOREIGN PATENT DOCUMENTS

EP 3187661 5/2021
NL 2028525 1/2023

\* cited by examiner

ENERGY TRANSFER SYSTEM WITH UNDERGROUND THERMAL STORAGE AND CORRESPONDING METHOD

CROSS-REFERENCE TO RELATED APPLICATIONS

This application is a continuation-in-part application of US patent application U.S. Ser. No. 18/584,190 filed on Feb. 22, 2024 entitled "Energy Transfer System with Underground Thermal Storage", and also claims priority to US provisional patent application U.S. 63/594,000 filed on Oct. 29, 2023 entitled "Multi-Source Heat Pumps for Large Scale Applications" the contents of both of which are hereby fully incorporated by reference.

BACKGROUND OF THE INVENTION

The invention relates to thermal energy transfer systems that incorporate one or more underground thermal energy storage units.
Relevant Prior Art Includes:
NL 2028525 filed by Geerts on Jun. 24, 2021 entitled "System for storage of thermal energy" that relates to a thermal energy storage system, the system comprising a subsurface tank.
EP 3187661 filed by Geerts on Dec. 22, 2016 entitled "Subsurface Tank" that relates in general to a subsurface tank, a method of installing such a tank and the use of such a tank, the tank being arranged for holding a liquid. The invention relates more in particular to a subsurface storage tank for storing thermal seasonal energy.
U.S. Ser. No. 11/105,568 issued to Gaylord Olson on Aug. 31, 2021 entitled "System and Method for Managing Source Fluid" that relates to a simple, cost-effective system and method for flexibly managing heat pump source fluid. The source fluid flow-manager significantly enhances heat pump efficiency by selectively coupling it to renewable energy resources via geothermal, solar, and ambient air thermal exchanges or heat exchangers.

Various implementations are known in the art, but fail to address all of the problems solved by the invention described herein. Various embodiments of this invention are illustrated in the accompanying drawings and will be described in more detail below.

SUMMARY OF THE INVENTION

Inventive systems and methods of thermal energy transfer that incorporate an underground thermal energy storage unit that may use one or more horizontally arrayed thermal exchanges or heat exchangers are disclosed.

In a preferred embodiment, the thermal energy transfer system may incorporate a heat pump, a thermal energy processing unit and underground thermal energy storage unit. The underground thermal energy storage unit may, for instance, include one or more horizontally arrayed thermal exchanges or heat exchangers surrounded by aggregate. The aggregate may, for instance, be any suitable natural or artificially created porous or semi-porous load bearing material such as, but not limited to, sand, earth, soil, crushed or pulverized gravel or rock, crushed or pulverized glass, or some combination thereof. The thermal energy processing unit may, for instance, be, a unit such as, but not limited to, a dry cooler, a solar thermal array, or some combination thereof.

The components of the thermal energy transfer system may be fluidly interconnected by a combination of one or more fluid pumps and associated valves and fluid conduits that may allow thermal energy acquired by the thermal energy processing unit to be supplied to either the heat pump or the horizontally arrayed thermal exchanges or heat exchangers. The system may also be arranged to allow thermal energy stored in the aggregate to be supplied via the horizontally arrayed thermal exchanges to the heat pump.

In a further embodiment, the system may include a water supply pipe that may drip feed water to the aggregate surrounding the one or more horizontally arrayed thermal exchanges or heat exchangers. In this way, the aggregate may become moist, i.e., it may, for instance, be made to contain between 10% and 35% by weight of water, thereby enhancing its ability to store thermal energy.

The system may also include a layer of dry aggregate situated above the moist aggregate. The dry aggregate may, for instance, contain less than 10% water by weight. The dry aggregate may be shielded by a roof-like structure made up of one or more layers of a suitable waterproof liner or a water impermeable fabric. This arrangement may, for instance, provide improved thermal isolation of the moist aggregate, thereby enhancing its ability to store thermal energy over time.

In a further embodiment of the present invention, there may also or instead be a layer of water impermeable fabric that may fully surround the moist aggregate. This may, for instance, allow the aggregate to become fully saturated, i.e., be made to contain, for instance, more than 35% of water by weight, thereby further enhancing its ability to store thermal energy.

The horizontally arrayed thermal exchanges or heat exchangers may, for instance, be one or more spiral pipe arrays and they may have a centrally located fluid connection and a peripherally located fluid connection. This arrangement of connections may, for instance, allow for more efficient storage of thermal energy. For instance, in order to store heat more efficiently, heated fluid may be directed to the central connection. In this way, the heat stored in the aggregate surrounding the central portion may not be dissipated as rapidly as if the heat were stored in the periphery of the storage region.

In a further embodiment, the horizontally arrayed thermal exchange or heat exchanger may instead consist of two linked slinky units having a centrally located fluid connection and two peripherally located fluid connections.

Therefore, the present invention succeeds in conferring the following, and others not mentioned, desirable and useful benefits and objectives.

It is an object of the present invention to provide an efficient system of thermal energy storage.

It is another object of the present invention to provide a system that may be used for storing energy for both heating and cooling structures.

DETAILED DESCRIPTION OF THE INVENTION

Figure 1:
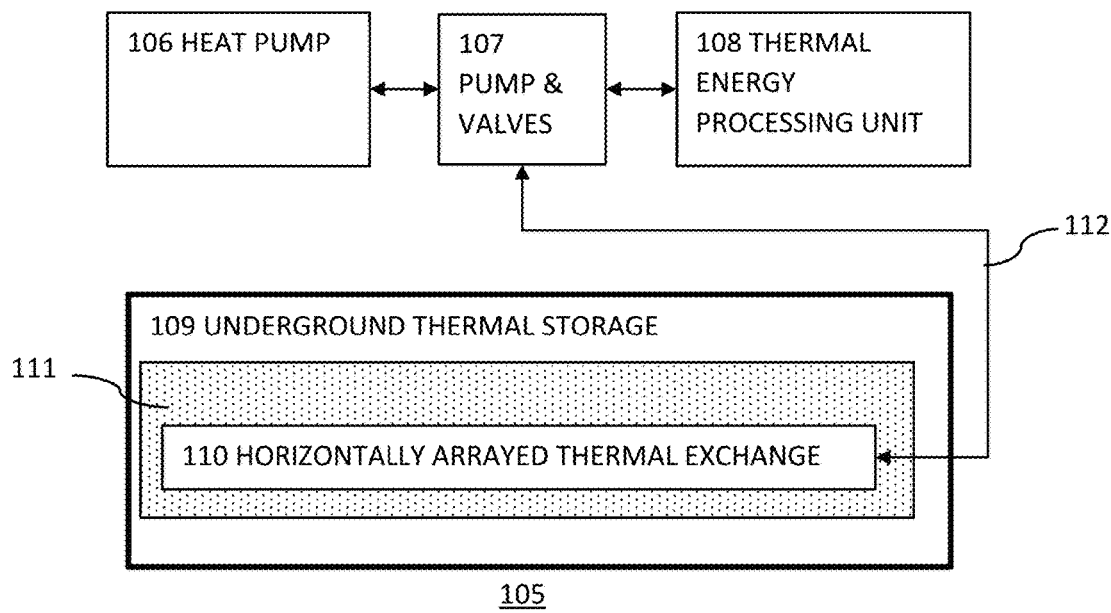
FIG. 1 shows a schematic representation of a thermal energy transfer system of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation 105 of a thermal energy transfer system of the present invention.

As shown in FIG. 1, the thermal energy transfer system 105 may include a heat pump 106, one or more fluid pumps and associated fluid directing valves 107, a thermal energy processing unit 108 and an underground thermal energy storage unit 109.

The thermal energy processing unit 108 may, for instance, be a unit capable of harvesting or dissipating thermal energy such as, but not limited to, a dry cooler or a solar thermal array, or some combination thereof.

The underground thermal energy storage unit 109 may include one or more horizontally arrayed thermal exchanges 110 that may be surrounded by aggregate 111. The aggregate may, for instance, be any suitable natural or artificially created porous or semi-porous load bearing material such as, but not limited to, sand, earth, soil, crushed or pulverized gravel or rock, crushed or pulverized glass, crushed or pulverized plastic or rubber, or some combination thereof. The thermal energy processing unit may, for instance, be a unit such as, but not limited to, a dry cooler, a solar thermal array, or some combination thereof.

The heat pump, the thermal energy processing unit and the horizontally arrayed thermal exchange or heat exchanger may be fluidly connected by at least one fluid pump and at least one fluid controlling valve such that thermal energy acquired by the thermal energy processing unit may supplied or directed to either the heat pump or the horizontally arrayed thermal exchange or heat exchanger.

The fluid connections 112 may also allow thermal energy that may have been stored in the aggregate to be supplied via the horizontally arrayed thermal exchange or heat exchanger to the heat pump which may be heating or cooling a structure (the structure is not shown).

Figure 2:
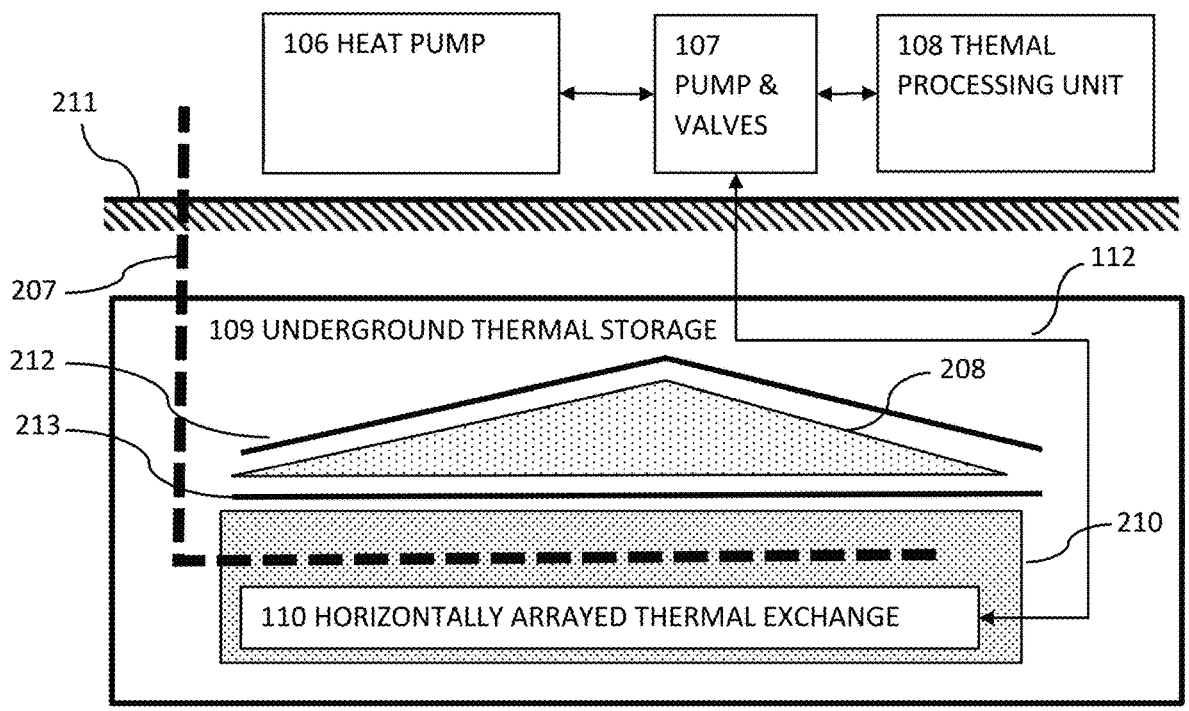
FIG. 2 shows a schematic representation of one embodiment of a thermal energy transfer system of the present invention.

FIG. 2 shows a schematic representation 200 of one embodiment of a thermal energy transfer system of the present invention.

The thermal energy transfer system may include one or more heat pumps 106, one or more fluid pumps and associated fluid control valves 107, one or more thermal energy processing units and an underground thermal energy storage unit 109. As shown in FIG. 2 the thermal energy processing units may include a dry cooler 205, or a solar thermal array 206, or some combination thereof.

The underground thermal energy storage unit may be located below ground level 211 and may include one or more horizontally arrayed thermal exchanges or heat exchangers 110 that may be surrounded by a layer of moist aggregate 210. The aggregate may be made moist by water that may be supplied by a water supply pipe 207. The water supply pipe may, for instance, drip feed water into the aggregate. Moist aggregate may, for instance, have a specific heat capacity greater than that of dry aggregate. The moisture may therefore help enhance the system's thermal energy retention capacity and the thermal conductivity of the aggregate.

The Merriam Webster dictionary defines "moist" as "slightly or moderately wet". In order to make the term quantitative, for the purpose of this application, "moist" is hereby defined to mean that the aggregate may contain between 10% and 35% of water by weight. This determination of percentage water content may, for instance, be made by obtaining a sample of the soil or aggregate, taking a first weight of the sample, then drying the sample at a temperature in a range of 100-110 degrees Centigrade until the sample reaches a constant weight. A second weight may then be taken of the dried sample. The % of water in the sample of soil or aggregate may then be calculated as the difference between the first and second weights as a percentage of the first weight.

The underground thermal energy storage unit may also include a layer of dry aggregate 208 that may be situated between the moist aggregate 210 and ground level 211. This layer of dry aggregate may provide thermal insulation of the moist aggregate thereby helping facilitate thermal energy storage in the moist aggregate.

The Merriam Webster dictionary defines dry as "free or relatively free from a liquid and especially water". In order to make the term quantitative for the purpose of this application, "dry" is hereby defined to mean that the aggregate may contain less than 10% of water by weight. This determination may, for instance, be made using the method outlined above.

The dry aggregate may be kept dry by one or more protective liners that may be layers of water impermeable fabric or material. A first layer of water impermeable fabric 212 may, for instance, be placed above the layer of dry aggregate 208. This first layer of water impermeable fabric may, for instance, provide a shield or roof above the dry aggregate. A second layer of water impermeable fabric 213 or material may be situated between the layer of dry aggregate and the layer of moist aggregate so as to prevent moisture being wicked up by capillary action from the moist to the dry aggregate, thereby helping retain the thermally insulating property of the dry aggregate.

Suitable water impermeable fabrics and materials may include plastic liners, polymer coated fabrics such as, but not limited to, vinyl coated polyester, polyurethane or polyvinyl chloride coated fabrics, rubberized fabrics coated with, for instance neoprene or butyl rubber, or high-density polyethylene fabrics in which the fibers themselves are inherently resistant to water penetration, or some combination thereof.

The systems typically also include one or more fluid connections 112 that may allow thermal energy that may have been stored in the moist aggregate to be supplied in a fluid via the horizontally arrayed thermal exchange or heat exchanger to the heat pump which may be heating or cooling a structure.

Figure 3:
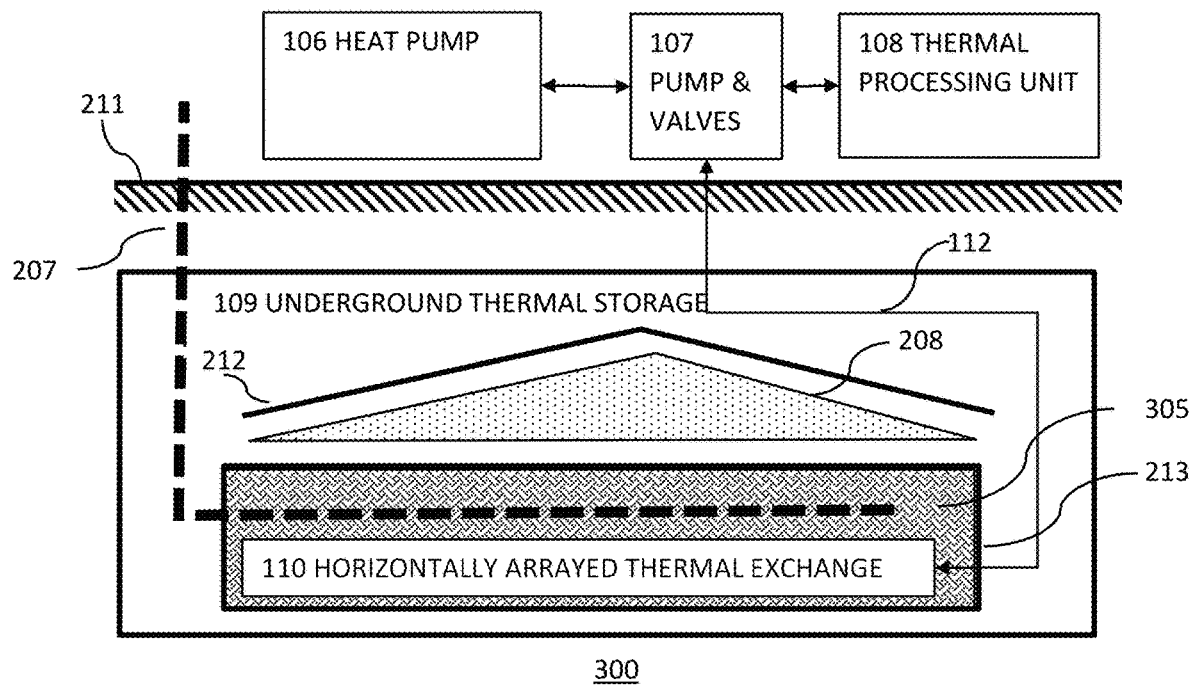
FIG. 3 shows a schematic representation of a further embodiment of a thermal energy transfer system of the present invention.

FIG. 3 shows a schematic representation of a further embodiment of a thermal energy transfer system of the present invention.

The system represented in FIG. 3 contains many of the elements shown and described in connection with FIG. 2, i.e., the heat pump 106, the fluid pump and associated valves 107, the thermal energy processing unit 108, the dry aggregate 208 and the roof-like first layer of water impermeable fabric 212 or material. However, in the system represented in FIG. 3, the horizontally arrayed thermal exchanges or heat exchangers 110 may be surrounded by a layer of fully saturated aggregate 305. This level of saturation of the aggregate may be maintained by having the second layer of water impermeable fabric 213 fully surround the layer of fully saturated aggregate. This fully surrounding layer of water impermeable fabric or material may allow water supplied by the water supply pipe 207 to be retained for a sufficiently long time in the aggregate to allow it to become a fully saturated layer of aggregate, further increasing its specific heat capacity and therefore further increasing its capacity to retain thermal energy and its ability to conduct thermal energy. Dry soil typically has a specific heat of around 0.5 to 2.0 kilojoules per kilogram per degree Celsius (kJ/kg° C.), whereas water typically has a specific heat of about 4 kilojoules per kilogram per degree Celsius (kJ/kg° C.). This means that the thermal capacity of a fully saturated layer of aggregate may be as much as eight times more than that of a layer of dry aggregate.

The Merriam Webster dictionary defines "saturated" as "full of moisture; made thoroughly wet". In order to make the terms quantitative for the purpose of this application, "saturated" may, for instance, be defined as containing more than 35% of water by weight. This determination may, for instance, be made using the method outlined above.

Figure 4:
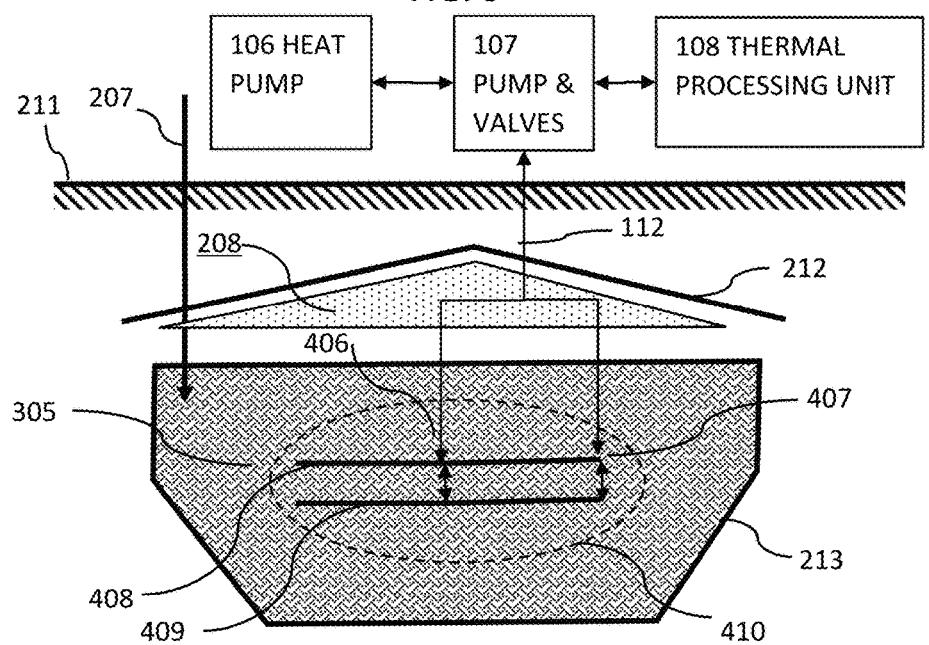
FIG. 4 shows a schematic representation of yet another embodiment of a thermal energy transfer system of the present invention.

FIG. 4 shows a schematic representation 400 of yet another embodiment of a thermal energy transfer system of the present invention.

The system represented in FIG. 4 contains many of the elements shown and described in connection with FIG. 3, i.e., the heat pump 106, the fluid pump and associated valves 107, the thermal energy processing unit 108, the layer of dry aggregate 208, the roof-like, first layer of water impermeable fabric 212, the fully surrounding layer of water impermeable fabric 213 and the water supply pipe 207.

However, the system represented in FIG. 4 contains two spiral pipe arrays, a first spiral pipe array 408 and a second spiral pipe array 409 as the horizontally arrayed thermal exchanges or heat exchangers. A plan view of such a spiral pipe array 405 may, for instance, be found in FIG. 5 and is discussed in more detail below. Although the horizontally arrayed thermal exchanges or heat exchangers may be of pipes in a wide variety of geometries, a spiral arrangement has the advantage that the thermal energy may be concentrated at the central region of the spiral. This advantage may be increased by having a centrally located fluid connection 406 and a peripherally located fluid connection 407.

A centrally located fluid connection 406 may, for instance, connect the fluid pump and associated valves 107 to the horizontally arrayed thermal exchanges or heat exchangers, in this instance, the spiral pipe arrays, in a vicinity of a mid-point of the horizontally arrayed thermal exchanges or heat exchangers via the fluid connection 112.

The peripherally located fluid connection 407 may, for instance, connect the fluid pump and associated valves 107 to the horizontally arrayed thermal exchanges or heat exchangers, in this instance, the spiral arrays, in a vicinity of a horizontal end point or a horizontal edge of the horizontally arrayed thermal exchanges or heat exchangers via the fluid connection 112.

For instance, the underground thermal energy storage unit may be being used to store heat. In such a case, heat gathered from a thermal energy processing unit may be directed to the centrally located fluid connection. In this manner, a majority of the heat may be stored in a region of the layer of fully saturated aggregate 305 approximating a flattened sphere of thermal retention 410 centered on the center of the spiral. The central region of the fully saturated aggregate may, therefore, become the hottest region. Thermal transfer fluid in the spiral arrays heated by this region may have the highest temperature and allow the most efficient operation of the heat pump for warming a structure. To do this, hot thermal fluid may be directed to the heat pump 106 from this region via the same centrally located fluid connection 406 and the fluid connection 112.

Conversely, the underground thermal energy storage unit may be being used to store cold in the fully saturated aggregate. In such a case, fluid cooled by a thermal energy processing unit may then be directed to the centrally located fluid connection. In this manner, the cold may be stored in a region of the fully saturated aggregate approximating a flattened sphere of thermal retention 410 centered on the center of the spiral. The central region of the fully saturated layer of aggregate 305 may, therefore, become the coldest region. Thermal transfer fluid contained in the spiral arrays cooled in this region may, therefore, have the lowest temperature and allow the most efficient operation of the heat pump for cooling a structure. To do this, cold thermal transfer fluid may be directed to the heat pump 106 from this region via the same centrally located fluid connection 406 and the fluid connection 112.

This concentration of the stored thermal energy may be further enhanced by stacking spiral pipe arrays 408 and 409 above each other, with each separated by a suitable amount of the fully saturated aggregate.

Although the thermal energy transfer systems described above have only shown one underground thermal energy storage unit, one of ordinary skill in the art may realize that the systems may effectively incorporate multiple underground thermal energy storage units, some of which may be used to store heat in order to assist the heat pump 106 in providing heat, while others may be used to effectively store cold in order to assist the heat pump in cooling structures.

Although the horizontally arrayed thermal exchanges or heat exchangers are described in reference to FIG. 4 as spiral pipe arrays, one of ordinary skill in the art, may readily appreciate that they may take a variety of geometries such as, but not limited to, one or more slinky units.

Figure 5:
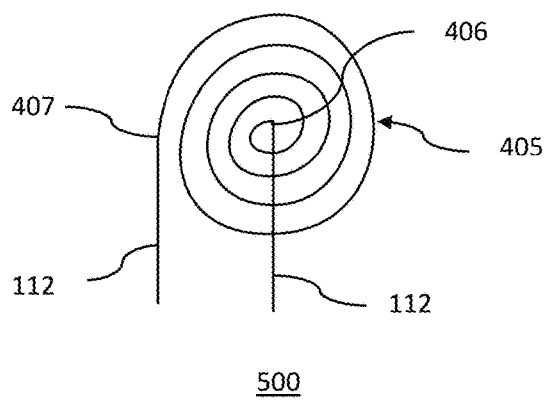
FIG. 5 shows a schematic plan view of a spiral pipe array.

FIG. 5 shows a schematic plan view 500 of a spiral pipe array 405. The spiral pipe array may, for instance, act as a horizontally arrayed thermal exchange or heat exchanger.

The center of the spiral pipe array 405 may, for instance, have a centrally located fluid connection 406 that may lead via a fluid connection 112 to another part of the system, such as, but not limited to, the fluid pump and associated valves (not shown in FIG. 5).

The edge of the spiral pipe array 405 may, for instance, have a peripherally located fluid connection 407 that may lead via a fluid connection 112 to another part of the system, such as, but not limited to, the fluid pump and associated valves (not shown in FIG. 5).

Figure 6:
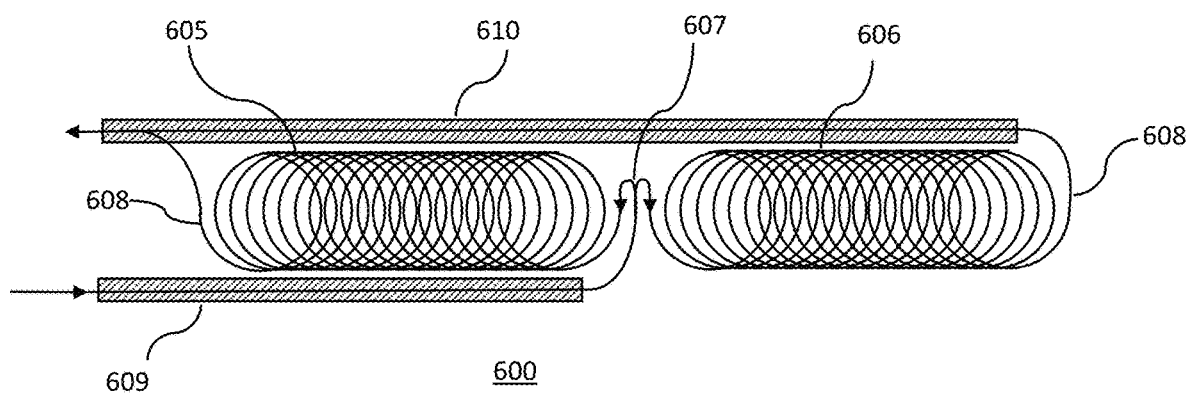
FIG. 6 shows a schematic plan view of a dual slinky design of the present invention having two laterally connected slinky units.

FIG. 6 shows a schematic plan view 600 of a dual slinky design of the present invention having two laterally connected slinky units. The slinky units may, for instance, act as horizontally arrayed thermal exchange or heat exchanger.

The slinky units may contain and transport thermal energy storage fluid and may be made of any suitable material capable of containing fluid and having reasonable thermal conduction properties such as, but not limited to, copper, aluminum, polyethylene (PE), polyvinyl chloride (PVC), polypropylene (PP), and polybutylene (PB), or some combination thereof.

The two slinky units 605 and 606 may be joined laterally at a centrally located fluid connection 607 and have two peripherally located fluid connections 608. In that way, when the dual slinky design is being used to store heat, hot fluid from a thermal energy processing unit may enter via an insulated entrance pipe 609. warm fluid may also be extracted via the insulated entrance pipe 709 as the central region may represent the warmest region surrounding the dual slinkies.

Figure 7:
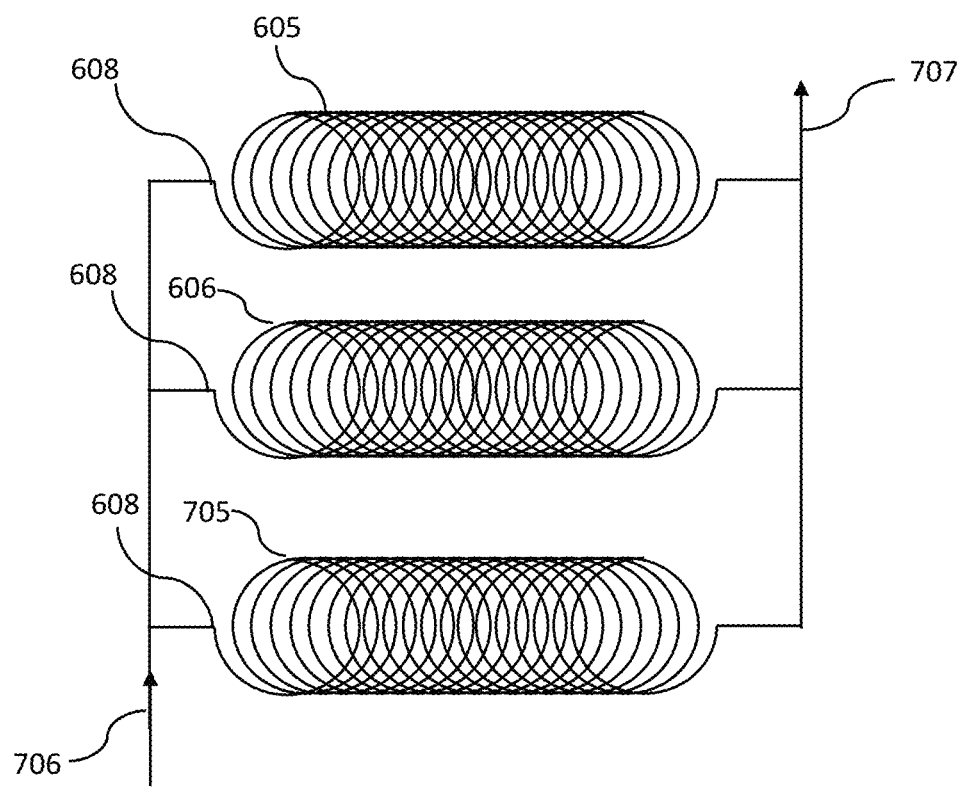
FIG. 7 shows a schematic plan view of a multi slinky module of the present invention having peripherally connected slinkies.

FIG. 7 shows a schematic plan view 700 of a multi slinky module of the present invention having peripherally connected slinkies. The slinky units may, for instance, act as horizontally arrayed thermal exchange or heat exchanger.

As shown in FIG. 7, the three slinky units, 605, 606 and 705, may each be joined at one peripheral end by a peripherally located fluid connection 608 to an inflow fluid connection 706. At a second peripheral end, each of the slinky units may be joined by a peripherally located fluid connection 608 to an outflow fluid connection 707.

The inflow fluid connection 706 may, for instance, transport thermal energy storage fluid from the systems fluid pump and associated valves (not shown) to the slinky units. The thermal energy storage fluid may, for instance, be a fluid such as, but not limited to, water or a mixture of water and antifreeze such as, but not limited to, propylene glycol, or some combination thereof.

One of ordinary skill in the art may appreciate that the fluid flows may also or instead be operated in a reverse manner, i.e., the inflow fluid connection may function as an outflow fluid connection and the outflow fluid connection may function as an inflow fluid connection.

The outflow fluid connection 707 may, for instance, transport thermal energy storage fluid from the slinky units back to the systems fluid pump and associated valves (not shown).

Figure 8:
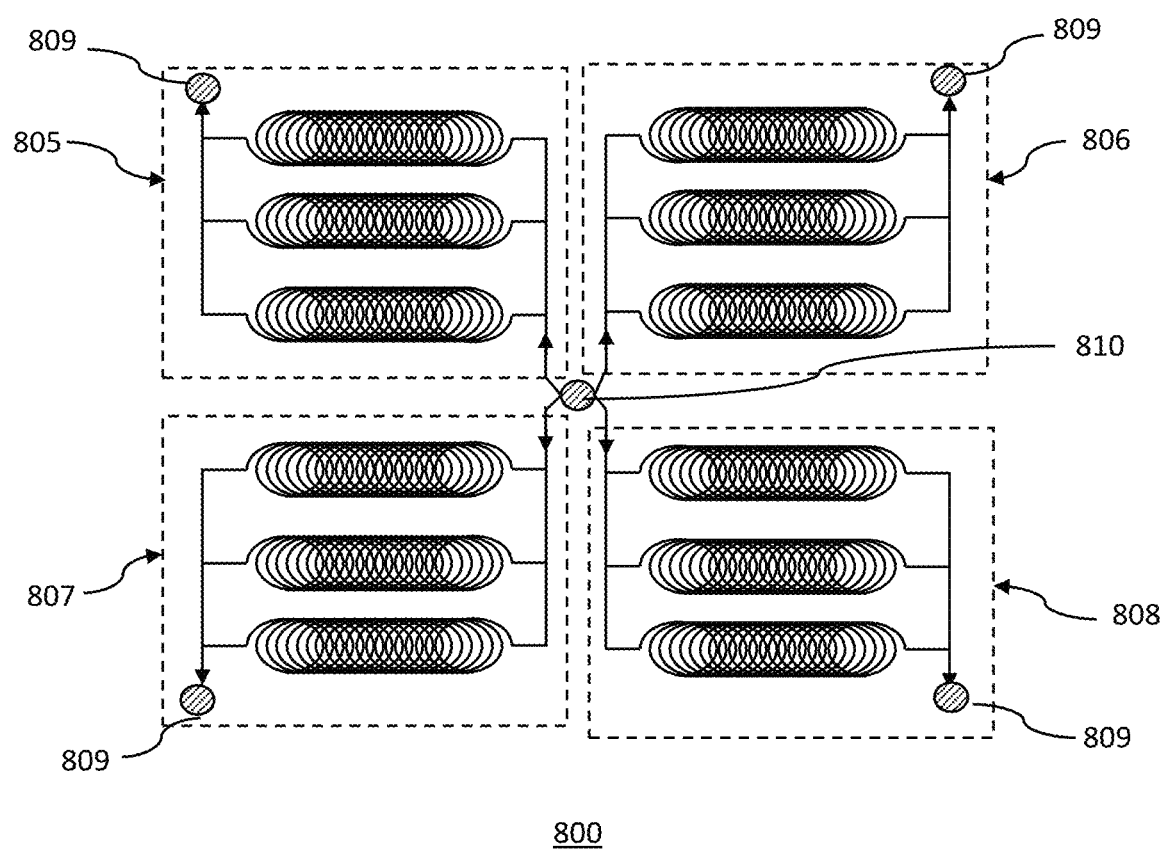
FIG. 8 shows a schematic plan view of a multi-module slinky horizontally arrayed thermal exchange or heat exchanger of the present invention.

FIG. 8 shows a schematic plan view of a multi-module slinky horizontally arrayed thermal exchange or heat exchanger 800 of the present invention.

The multi-module slinky horizontally arrayed thermal exchange or heat exchanger 800 shown in FIG. 8 is composed of four of the multi slinky modules shown in FIG. 7, namely a first multi-slinky modules 805, a second multi-slinky modules 806, a third multi-slinky modules 807 and a fourth multi-slinky modules 808.

As shown, the inflow fluid connection of each of the multi-slinky modules may be connected to a single central vertical fluid connection 810. Similarly, while the outflow fluid connections of each of the multi-slinky modules are shown connected to a distinct peripheral vertical fluid connection 809, they may all be combined to a single peripheral vertical fluid connection.

The peripheral vertical fluid connections and the central vertical fluid connection may, for instance, transport thermal energy storage fluid from the systems to or from the fluid pump and associated valves (not shown). The thermal energy storage fluid may, for instance, be a fluid such as, but not limited to, water or a mixture of water and antifreeze such as, but not limited to, propylene glycol, or some combination thereof.

One of ordinary skill in the art may appreciate that the number of multi-slinky modules and the number of slinky units they each contain may vary. There may, for instance, be as few as two multi-slinky modules, and each multi-slinky module may have one or more slinkies.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A thermal energy transfer system, comprising:
a heat pump;
a thermal energy processing unit that is one of a dry cooler and a thermal array;
an underground thermal energy storage unit comprising:
one or more heat exchangers surrounded by a first layer of aggregate, said heat exchangers having long axes aligned with and/or parallel to each other
a water supply pipe drip feeding water to said first layer of aggregate, thereby causing said first layer of aggregate to contain between 10% and 35% of water by weight:
a second layer of aggregate, situated above said first layer of aggregate, said second layer of aggregate containing less than 10% of water by weight;
a first layer of water impermeable material situated above said second layer of aggregate; and,
a second layer of water impermeable material situated between said second layer of aggregate and said first layer of aggregate, thereby helping ensure that said layer of aggregate contains less than 10% of water by weight; and,
wherein said heat pump, said thermal energy processing unit and said one or more heat exchangers are fluidly connected by at least one fluid pump and at least one valve such that thermal energy acquired by said thermal energy processing unit is supplied to either said heat pump or to said one or more heat exchangers; and,
wherein thermal energy stored in said first layer of aggregate is supplied via said one or more heat exchangers to said heat pump.

2. The system of claim 1, wherein said second layer of water impermeable material fully surrounds said layer of moist aggregate, thereby helping cause said layer of moist aggregate to become a layer of fully saturated aggregate containing more than 35% water by weight.

3. The system of claim 1, wherein said heat exchangers comprises one or more spiral pipe arrays having at least one centrally located fluid connection.

4. The system of claim 3, wherein said heat exchangers comprise at least two of said spiral pipe arrays located one above the other.

5. The system of claim 1 wherein said heat exchangers comprise two laterally linked slinky units having one centrally located fluid connection.

6. The system of claim 1, wherein said heat exchangers comprises at least four multi-slinky modules, with each of said multi-slinky modules having at least one slinky unit.

7. A method of storing and transferring thermal energy, comprising:
providing a heat pump;
providing a thermal energy processing unit;

providing an underground thermal energy storage unit comprising:
  one or more heat exchangers surrounded by a first layer of aggregate;
providing a water supply pipe drip feeding water to said first layer of aggregate, thereby causing said first layer of aggregate to contain between 10% and 35% of water by weight;
providing a second, layer of aggregate, situated above said first layer of aggregate, said second, layer of aggregate containing less than 10% of water by weight;
providing a first layer of water impermeable material situated above said second layer of aggregate; and,
providing a second layer of water impermeable material situated between said second layer of aggregate and said layer of moist aggregate, thereby ensuring that said second layer of aggregate contains less than 10% of water by weight; and,
wherein said heat pump, said thermal energy processing unit and said heat exchangers are fluidly connected by at least one fluid pump and at least one valve such that thermal energy acquired by said thermal energy processing unit is supplied to either said heat pump or to said heat exchangers; and,
wherein thermal energy stored in said first layer of aggregate is supplied via said heat exchangers to said heat pump.

8. The method of claim 7, wherein said second layer of water impermeable material fully surrounds said first layer of aggregate, thereby causing said first layer of aggregate to contain more than 35% water by weight.

9. The method of claim 8, wherein said heat exchangers comprise one or more spiral pipe arrays having at least one centrally located fluid connection.

10. The method of claim 8, wherein said heat exchangers comprise one or more spiral pipe arrays having at least one centrally located fluid connection.

11. The method of claim 8, wherein said heat exchangers comprise two laterally linked slinky units having at least one centrally located fluid connection.

12. The method of claim 8, wherein said heat exchangers comprises at feast four multi-slinky modules, each of said multi-slinky modules having at least one slinky unit.

* * * * *